(12) United States Patent
Lin et al.

(10) Patent No.: US 10,145,709 B2
(45) Date of Patent: Dec. 4, 2018

(54) ABSOLUTE POSITION DETECTING DEVICE AND METHOD

(71) Applicant: NATIONAL TSING HUA UNIVERSITY, Hsinchu (TW)

(72) Inventors: Cheng-Yi Lin, Taoyuan (TW); Heng-Sheng Hsiao, Taipei (TW); Sheng-Ching Wang, Miaoli (TW); Tsung-Shune Chin, Hsinchu County (TW); Cheng-Kuo Sung, Hsinchu (TW); Jen-Yuan Chang, Hsinchu County (TW)

(73) Assignee: National Tsing Hua University, Hsinchu (TW)

( * ) Notice: Subject to any disclaimer, the term of this patent is extended or adjusted under 35 U.S.C. 154(b) by 1 day.

(21) Appl. No.: 15/223,527

(22) Filed: Jul. 29, 2016

(65) Prior Publication Data

US 2017/0254670 A1    Sep. 7, 2017

(30) Foreign Application Priority Data

Mar. 4, 2016  (TW) .............................. 105106798 A (51) Int. Cl.
  *G01D 5/165*  (2006.01)
  *G01D 5/245*  (2006.01)
(52) U.S. Cl.
  CPC .................................. *G01D 5/2452* (2013.01)
(58) Field of Classification Search
  CPC ......... G01D 5/12–5/2525; H03M 1/22; H03M 1/24; H03M 1/28; H03M 1/30; H03M 1/308
  See application file for complete search history.

(56) References Cited

U.S. PATENT DOCUMENTS

| 7,215,112 | B1* | 5/2007 | Recio ..................... | G01D 5/145 324/207.11 |
|---|---|---|---|---|
| 2006/0077083 | A1* | 4/2006 | Kiriyama ........... | G01D 5/24452 341/120 |
| 2008/0061771 | A1* | 3/2008 | Sugiyama ............ | G01D 5/2451 324/207.25 |
| 2010/0001717 | A1* | 1/2010 | Tomioka .............. | G01D 5/2457 324/207.11 |
| 2010/0057392 | A1* | 3/2010 | York .................. | G01D 5/24476 702/94 |
| 2010/0207475 | A1* | 8/2010 | Kawasaki ............ | G01D 5/2046 310/156.08 |
| 2011/0291780 | A1* | 12/2011 | Takahashi ............ | G01D 5/2451 335/284 |
| 2011/0309824 | A1* | 12/2011 | Takahashi ............. | F16C 41/007 324/207.13 |
| 2012/0104241 | A1* | 5/2012 | Toh ...................... | G01D 5/2451 250/231.1 |
| 2013/0063138 | A1* | 3/2013 | Takahashi .......... | G01D 5/24438 324/207.25 |

(Continued)

*Primary Examiner* — Huy Q Phan
*Assistant Examiner* — David Frederiksen
(74) *Attorney, Agent, or Firm* — Wang Law Firm, Inc.

(57) ABSTRACT

An absolute position detecting device and method are provided. The absolute position detecting device utilizes the incremental magnetization on a magnetic encoding ruler with two different pole widths, such that elliptical Lissajous curves may be obtained by magnetoresistive sensors. The absolute position may be obtained by determining the region of the signals on the ellipses read by the magnetoresistive sensors.

12 Claims, 6 Drawing Sheets

(56) References Cited

U.S. PATENT DOCUMENTS

2015/0091554 A1* 4/2015 LaCroix ................ H03M 1/308
 324/207.24
2015/0243427 A1* 8/2015 Takahashi ............. H01F 13/003
 335/284

* cited by examiner

ABSOLUTE POSITION DETECTING DEVICE AND METHOD

CROSS-REFERENCE TO RELATED APPLICATION

This application claims the benefit of Taiwan Patent Application No. 105106798, filed on Mar. 4, 2016, in the Taiwan Intellectual Property Office, the disclosure of which is incorporated herein in its entirety by reference.

BACKGROUND OF THE INVENTION

1. Field of the Invention

The present disclosure generally relates to an absolute position detecting device and method, and in particular, to an absolute position detecting device and method by determining the region of the signals read by the sensing module on the ellipses of Lissajous curves generated by the magnetoresistive sensors to obtain the absolute position of the sensing module.

2. Description of the Related Art

In the current position detecting system with the incremental magnetic encoding rulers, the read head needs to be initialized after the system resets, which is time-consuming. Despite the fact that the magnetic encoding rulers designed with mark point can be operated in more effective and quicker way than the incremental ones, it is not time economically feasible to locate the mark point whenever the system resets.

For the sake of resolving the aforementioned technical problems, the magnetic encoding rulers disposed with absolute encoding track are utilized. With the requirements for the longer length of the magnetic encoding rulers, the increasing number of bits of the absolute encoding track will lead to the raise of the number of sensors for the read head.

Hence, it has to develop an absolute position detecting device and method applied to precisely detect the absolute position of magnetic encoding ruler without extra sensors and initializing whenever the position detecting system is reset.

SUMMARY OF THE INVENTION

In view of the aforementioned technical problems, one objective of the present disclosure provides an absolute encoder including a magnetic encoding ruler, a first magnetoresistive sensor and a second magnetoresistive sensor. The magnetic encoding ruler includes a first magnetic path on which a plurality of first magnetic poles with opposite polarities are successively arranged, wherein a length of each of the plurality of first magnetic poles is a first pole width; and a second magnetic path parallel to the first magnetic path, on which a plurality of second magnetic poles with opposite polarities are successively arranged, wherein a length of each of the plurality of second magnetic poles is a second pole width, and the first pole width and the second pole width are different from each other. The first magnetoresistive sensor is disposed adjacent to the first magnetic path to detect magnetic fields of the first magnetic path and to generate a first magnetoresistive signal, and the second magnetoresistive sensor is disposed adjacent to the second magnetic path to detect magnetic fields of the second magnetic path and to generate a second magnetoresistive signal. The absolute encoder is configured to output the first and the second magnetoresistive signals.

Preferably, the absolute encoder further includes a processor electrically connected to the first and the second magnetoresistive sensors to respectively receive the first and the second magnetoresistive signals, when the magnetic encoding ruler moves relative to the first and the second magnetoresistive sensors along a longitudinal direction of the magnetic encoding ruler, the processor is configured to generate a first elliptical pattern according to the first magnetoresistive signal, and to generate a second elliptical pattern according to the second magnetoresistive signal.

Preferably, the absolute encoder further includes a database electrically connected to the processor, the database storing the absolute position information, and the absolute position information respectively defining the relationships between positions on the first and the second elliptical patterns and positions on the magnetic encoding ruler, and after the processor is configured to generate the first and the second elliptical patterns, the processor is further configured to compare the first and the second elliptical patterns with the absolute position information to obtain the absolute position on the magnetic encoding ruler.

Preferably, the first magnetoresistive signal includes a first A-phase signal and a first B-phase signal, the second magnetoresistive signal includes a second A-phase signal and a second B-phase signal, and the processor is configured to generate the first elliptical pattern according to the first A-phase signal and the first B-phase signal, and to generate the second elliptical pattern according to the second A-phase signal and the second B-phase signal.

Preferably, the plurality of first magnetic poles and the plurality of second magnetic poles are arranged along the longitudinal direction of the length of the magnetic encoding ruler.

Preferably, the lengths of north/south poles of the plurality of the second poles include a second to $N^{th}$ pole width in length, and the lengths of the second to Nth pole widths are different from each other.

In accordance with another objective of the present disclosure, an absolute position detecting device adapted to detect an absolute position of an object is provided, which includes a magnetic encoding ruler, a sensor module and a processor. The magnetic encoding ruler includes a first magnetic path on which a plurality of first magnetic poles with opposite polarities are successively arranged, wherein a length of each of the plurality of first magnetic poles is a first pole width; and a second magnetic path, parallel to the first magnetic path, on which a plurality of second magnetic poles with opposite polarities are successively arranged, wherein a length of each of the plurality of second magnetic poles is a second pole width, and the first pole width and the second pole width are different from each other. The sensor module is adhered to the object, and includes a first magnetoresistive sensor disposed adjacent to the first magnetic path to detect magnetic fields of the first magnetic path and to generate a first magnetoresistive signal; and a second magnetoresistive sensor disposed adjacent to the second magnetic path to detect magnetic fields of the second magnetic path and to generate a second magnetoresistive signal. The processor is electrically connected to the first and the second magnetoresistive sensors to respectively receive the first and the second magnetoresistive signals, and when the object moves relative to the magnetic encoding ruler, the processor is configured to generate a first elliptical pattern according to the first magnetoresistive signal, to generate a second elliptical pattern according to the second magnetoresistive signal, and to calculate the absolute position of the object according to the first and the second elliptical patterns.

Preferably, the absolute position detecting device further includes a database electrically connected to the processor, which stores absolute position information, the absolute position information defining the relationships between the positons on the first elliptical pattern and the second elliptical pattern and positons on the magnetic encoding ruler; and after the processor is configured to generate the first elliptical pattern and the second elliptical pattern, the processor is further configured to compare the first elliptical pattern and the second elliptical pattern with the absolute position information to obtain the absolute position of the object on the magnetic encoding ruler.

Preferably, the first magnetoresistive signal comprises a first A-phase signal and a first B-phase signal, the second magnetoresistive signal comprises a second A-phase signal and a second B-phase signal, and the processor is configured to generate the first elliptical pattern according to the first A-phase signal and the first B-phase signal, and to generate the second elliptical pattern according to the second A-phase signal and the second B-phase signal.

Preferably, the plurality of first poles and the plurality of second poles are arranged along a longitudinal direction of the magnetic encoding ruler.

Preferably, the lengths of north/south pole of the plurality of the second poles comprise a second to Nth pole widths, and the lengths of the second to Nth pole widths are different from each other.

In accordance with yet another objective of the present disclosure, a method of detecting an absolute position adapted to the absolute position detecting device is provided, which includes following steps of: adhering an object to the sensor module; moving the object relative to the magnetic encoding ruler, the first magnetoresistive sensor and the second magnetoresistive sensor respectively outputting the first magnetoresistive signal and the second magnetoresistive signal; receiving the first magnetoresistive signal and the second magnetoresistive signal by the processor, and generating a first elliptical pattern according to the first magnetoresistive signal and a second elliptical pattern according to the second magnetoresistive signal, respectively; and calculating the absolute position of the object on the magnetic encoding ruler according to the first and the second elliptical patterns by the processor.

Preferably, the first magnetoresistive signal includes a first A-phase signal and a first B-phase signal, the second magnetoresistive signal includes a second A-phase signal and a second B-phase signal, and the processor is configured to generate the first elliptical pattern according to the first A-phase signal and the first B-phase signal, and to generate the second elliptical pattern according to the second A-phase signal and the second B-phase signal.

Preferably, the plurality of first poles and the plurality of second poles are arranged along a longitudinal direction of the magnetic encoding ruler.

Preferably, lengths of north/south poles of the plurality of the second poles include a second to Nth pole widths, and the lengths of the second to Nth pole widths are different from each other.

In conclusion, compared with the existing technique, the absolute encoder, absolute position detecting device and method provided in the present disclosure are cost-effectively feasible, as the read head is only disposed with two identical magnetoresistive sensors to determine the absolute position according to the magnetoresistive signal produced by the magnetic encoding ruler without a plurality of hall sensors correspondingly arranged to different pole widths of the magnetic coder and relocating whenever the magnetic encoding ruler is switched off and then restarted. As a consequence, the design and production cost are saved greatly.

BRIEF DESCRIPTION OF THE DRAWINGS

Hereinafter, embodiments of the present disclosure will be described in detail with reference to the accompanying drawings so that those skilled in the art to which the present disclosure pertains can realize the present disclosure, in which.

DETAILED DESCRIPTION OF THE PREFERRED EMBODIMENTS

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 1:
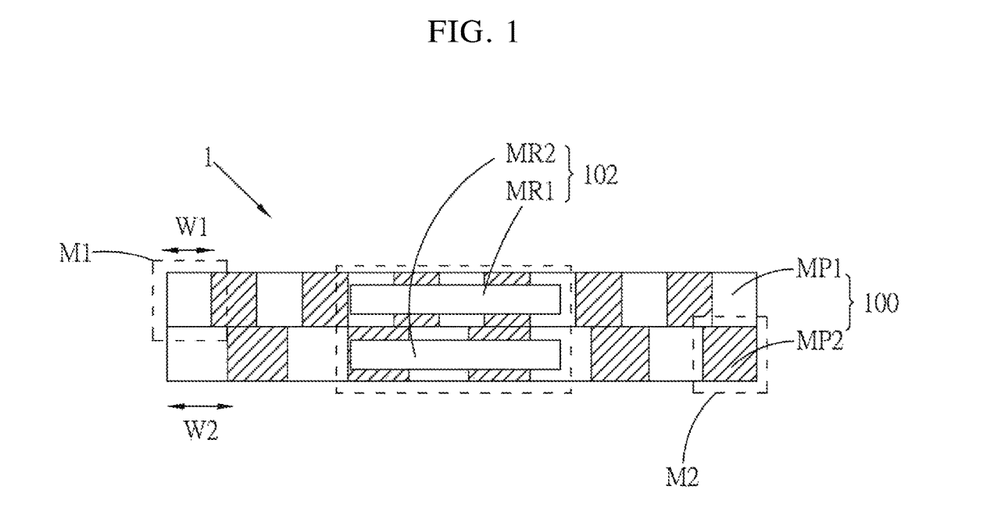
FIG. 1 is a schematic diagram of the first embodiment of the absolute encoder in accordance with the present disclosure.

FIG. 1 is a schematic diagram of the first embodiment of the absolute encoder in accordance with the present disclosure. As shown in the figure, an absolute encoder provided in the present disclosure includes a magnetic encoding ruler 100, a first magnetoresistive sensor MR1, and a second magnetoresistive sensor MR2. The magnetic encoding ruler 100 includes a first magnetic path MP1 and a second magnetic path MP2. A plurality of first magnetic poles M1 with opposite polarities are successively arranged on the first magnetic path MP1, and lengths of the plurality of first magnetic poles M1 are denoted as first pole widths W1. The second magnetic path MP2 is disposed parallel to the first magnetic path MP2, a plurality of second magnetic poles M2 with opposite polarities are successively arranged on the second magnetic path MP2, and lengths of the plurality of second magnetic poles M2 are denoted as second pole widths W2. The first pole widths W1 and the second pole widths W2 are different from each other.

In the preferred embodiment of the present disclosure, the first magnetic path MP1 is arranged adjacent to the first magnetic path MP1 to detect magnetic fields of the first magnetic path MP1, and is configured to generate a first magnetoresistive signal. The second magnetic path MP2 is arranged adjacent to the second magnetic path MP2 to detect magnetic fields of the second magnetic path MP2, and is configured to generate a second magnetoresistive signal. An absolute encoder 1 is configured to output the first and the second magnetoresistive signals.

Figure 2:
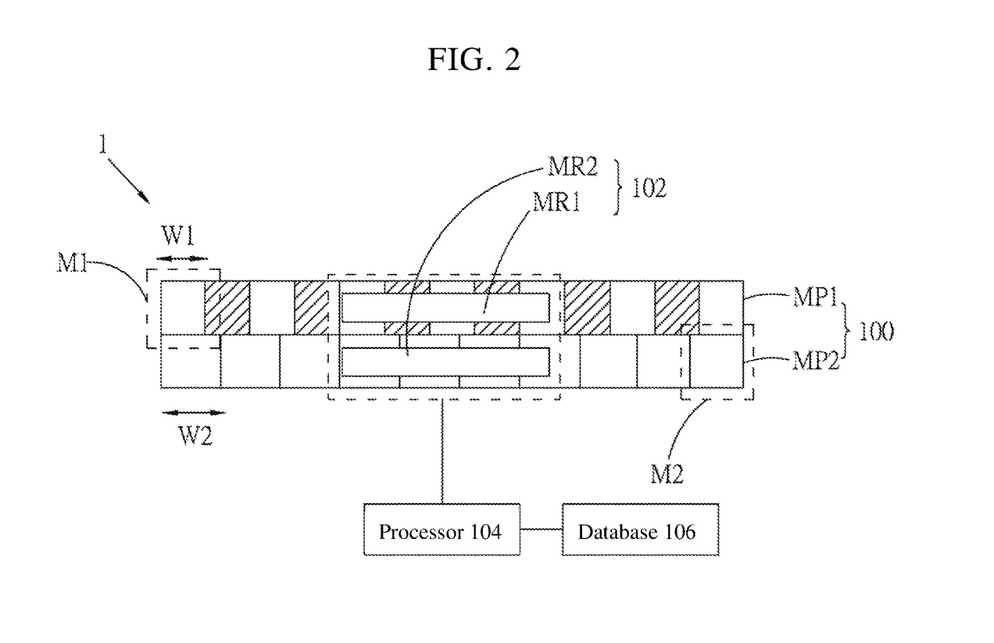
FIG. 2 is a schematic diagram of the first embodiment of the absolute encoder in accordance with the present disclosure.

FIG. 2 is a schematic diagram of the first embodiment of the absolute encoder in accordance with the present disclosure. A processor 104 is electrically connected to a first magnetoresistive sensor MR1 and a second magnetoresistive sensor MR2 of a sensor module 102 to respectively receive the first and the second magnetoresistive signals. When the magnetic encoding ruler 100 is moving relatively to the first magnetoresistive sensor MR1 and the second magnetoresistive sensor MR2 along a longitudinal direction thereof, the processor 104 generates a first elliptical pattern according to the first magnetoresistive signal, and generates a second elliptical pattern according to the second magnetoresistive signal.

Here, the first magnetoresistive signal includes a first A-phase signal and a first B-phase signal, and the second magnetoresistive signal includes a second A-phase signal and a second B-phase signal. The processor 104 generates the first elliptical pattern according to the first A-phase signal and the first B-phase signal, and generates the second elliptical pattern according to the second A-phase signal and the second B-phase signal. The elliptical pattern mentioned herein is the elliptical Lissajous curves that are known to those skilled in the present technical field, and it will be detailed in following paragraphs.

The absolute encoder shown in FIG. 2 further includes a database 106 which is electrically connected to the processor 104. The database 106 stores absolute position information, which respectively defines relationships between the first and the second elliptical patterns and positions on the magnetic encoding ruler. The user can define the first pole width W1 and the second pole width W2, such that the relationship defining how the angles correspond to the positions in the first elliptical pattern and the second elliptical pattern can be calculated and stored in the database 106. After the first elliptical pattern and the second elliptical pattern are generated by the processor 104, the first elliptical pattern and the second elliptical pattern are compared with the absolute position information to obtain the absolute position of the magnetic encoding ruler.

In other words, in order to obtain two elliptical Lissajous curves, two tracks with different pole widths are incrementally magnetized on the absolute magnetic encoding ruler 100. By determining the signals read by the first magnetoresistive sensor MR1 and the second magnetoresistive sensor MR2 and the region on the two ellipses, the processor 104 can obtain the absolute position of the sensor module 102.

Figure 3:
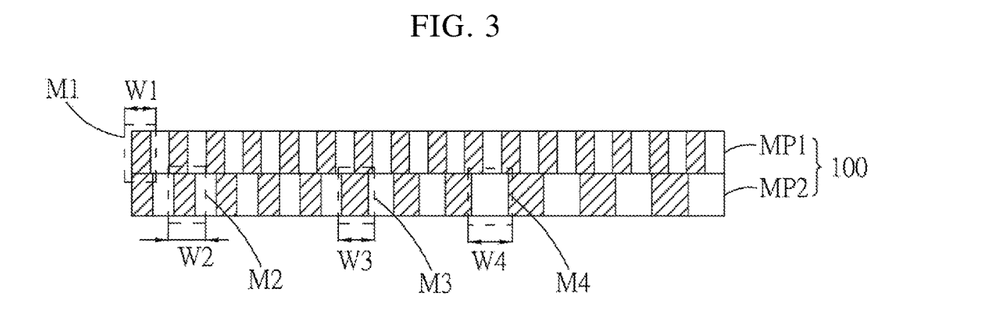
FIG. 3 is a schematic diagram of the second embodiment of the absolute encoder in accordance with the present disclosure.

FIG. 3 is a schematic diagram of the second embodiment of the absolute encoder in accordance with the present disclosure. As shown in figure, lengths of the plurality of second magnetic poles M2 may include second to Nth pole widths, and lengths of the second to the Nth pole widths are different from each other. According to the figure, the second magnetic path MP2 includes second magnetic poles M2 with second pole widths W2, third magnetic poles M3 with third pole widths W3, and fourth magnetic poles M4 with fourth pole widths W4. Besides, the second pole widths W2, the third pole widths W3 and the fourth pole widths W4 are different from the first pole widths W1. Therefore, three unique elliptical Lissajous curves can be obtained while the second magnetoresistive sensor MR2 detects. The first elliptical pattern is generated according to the first A-phase signal and the first B-phase signal of the first magnetoresistive signal produced by the first magnetoresistive sensor MR1, and the second, third and fourth elliptical patterns are generated according to the second A-phase signal and the second B-phase signal of the second magnetoresistive signal produced by the second magnetoresistive sensor MR2. Without the repeated angles in the elliptical patterns, the absolute position is obtained accordingly. In other words, the absolute magnetic encoding ruler of the present disclosure is encoded with the plurality of pole widths, but it shall not be limited thereto. For example, the first pole widths W1 of the first magnetic path WP1 may be 1 mm, and the second pole widths W2 of the second magnetic path WP2 may be 1.1 mm, 1.2 mm, 1.3 mm . . . , and so on.

By utilizing the arrangement mentioned above, the issue of the increasing numbers of the sensors of read heads results from the increasing numbers of bits for encoding as the length of the magnetoresistive ruler increases can be solved. The present disclosure is capable of obtaining the absolute position by using only two magnetoresistive sensors without the hall sensors correspondingly arranged to the pole widths of the magnetic encoding ruler. Hence, the present disclosure is cost-effectively feasible. Besides, whenever the magnetic encoding ruler is reset, the magnetic encoding ruler provided in the present disclosure can rapidly obtain the absolute position according to the signal associated to the magnetic encoding ruler so as to save the time for re-positioning.

Figure 4:
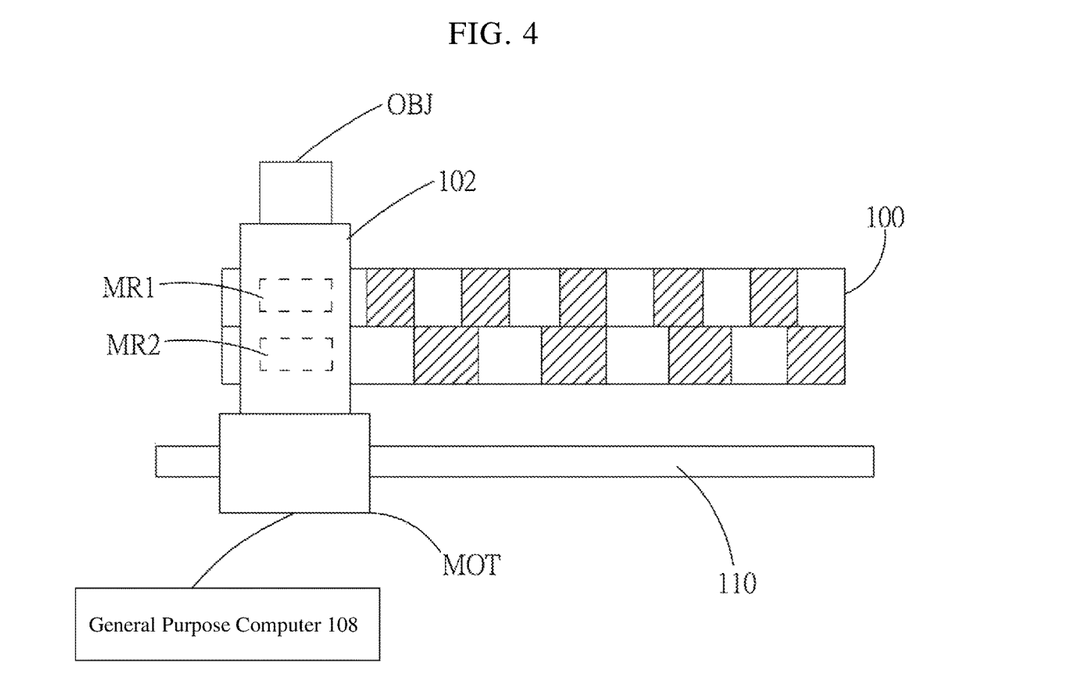
FIG. 4 is a schematic diagram of an embodiment of the absolute position detecting device in accordance with the present disclosure.

FIG. 4 is a schematic diagram of an embodiment of the absolute position detecting device in accordance with the present disclosure. As shown in the figure, a position detecting device 200 is configured to detect the absolute position of an object OBJ. The position detecting device 200 includes the magnetic encoding ruler 100, the sensor module 102 and a general purpose computer 108. Here, the magnetic encoding ruler 100 has the same arrangement of magnetic paths as mentioned above, therefore the repeated description are omitted hereinafter. Differently, one end of the sensor module 102 is adhered to the object OBJ, and the other end of the sensor module 102 is connected to a stepping motor MOT. The sensor module 102 includes the first magnetoresistive sensor MR1 and the second magnetoresistive sensor MR2. The general purpose computer 108 includes the processor and the database mentioned above, and respectively receives the first magnetoresistive signal and the second magnetoresistive signal. When the object OBJ is moving relatively to the magnetic encoding ruler 100 through the stepping motor MOT along a trail 100, the processor of the general purpose computer 108 generates the first elliptical pattern according to the first magnetoresistive signal, generates the second elliptical pattern according to the second magnetoresistive signal, and calculates the absolute position of the object on the magnetic encoding ruler based on the first and second ellipses patterns. Here, the calculation of the absolute position is the same as mentioned above, and the unnecessary details are not given herein.

Figure 5:
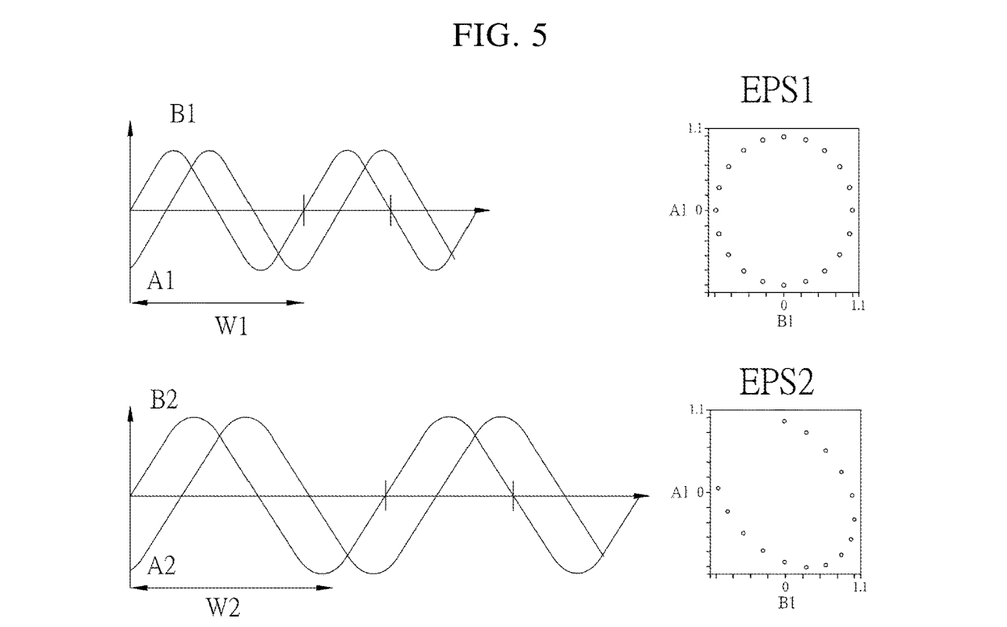
FIG. 5 is a schematic diagram illustrating an embodiment of the magnetoresistive signals and Lissajous curves in accordance with the present disclosure.

Referring to FIG. 5, which is a schematic diagram illustrating an embodiment of the magnetoresistive signals and Lissajous curves in accordance with the present disclosure. The embodiment of the first and second ellipses patterns according to the first and second magnetoresistive signals are described in detail hereinafter. Here, the first elliptical pattern EPS1 can be obtained according to the first magnetoresistive signal that includes the first A-phase signal A1 and the first B-phase signal B1, and the second elliptical pattern EPS2 can be obtained according to the second magnetoresistive signal that includes the second A-phase signal A2 and the second B-phase signal B2. As shown in the figure, when the sensor module 102 moves to the position at the first pole width W1, the first elliptical pattern EPS1 with a complete ellipse can be derived from the first A-phase signal A1 and the first B-phase signal B1, and the second elliptical pattern EPS2 can also be derived from the second A-phase signal A2 and the second B-phase signal B2. So, the absolute position information can be generated according to the unique relations of the first elliptical pattern EPS1 and the second elliptical pattern EPS2 at the position of the first pole width W1 accordingly and stored in the database.

Figure 6A:
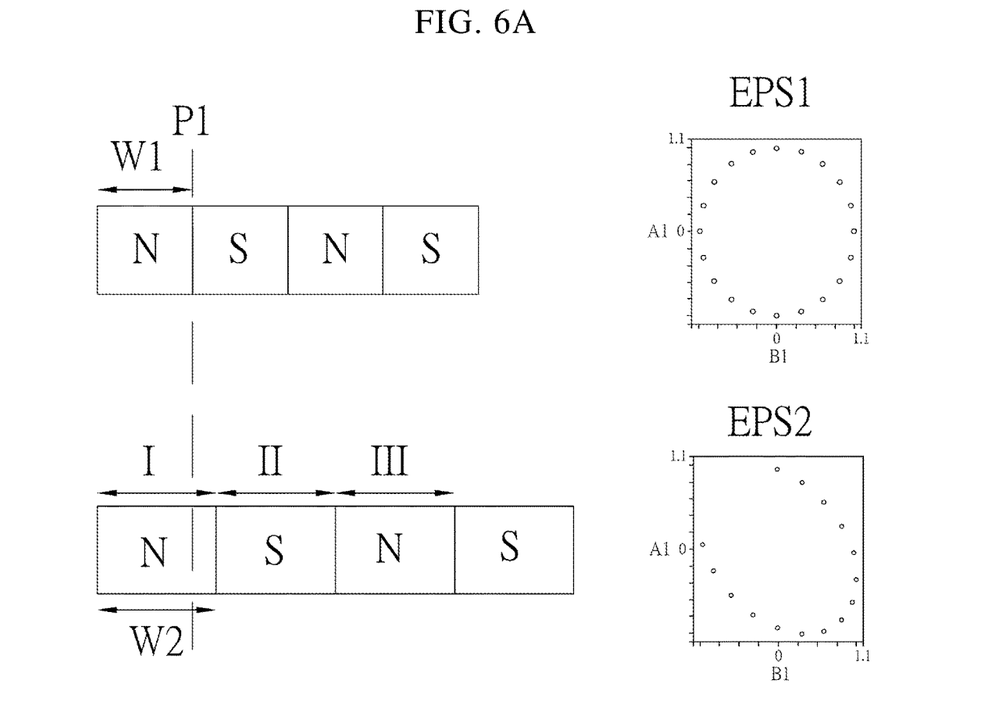
FIGS. 6A, 6B and 6C respectively are the schematic diagrams illustrating operating the absolute position detecting device in accordance with the present disclosure.
Figure 6B:
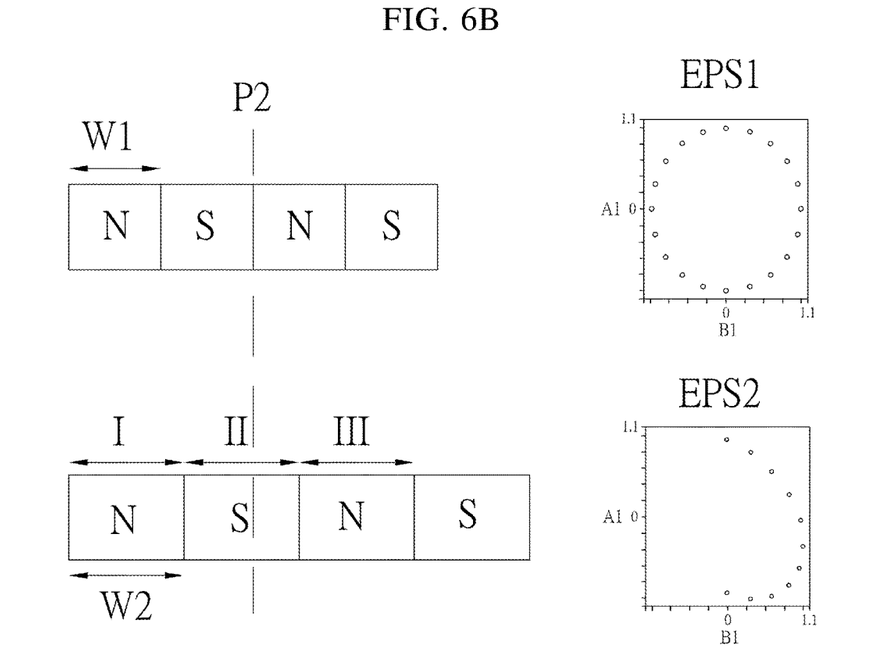
Figure 6C:
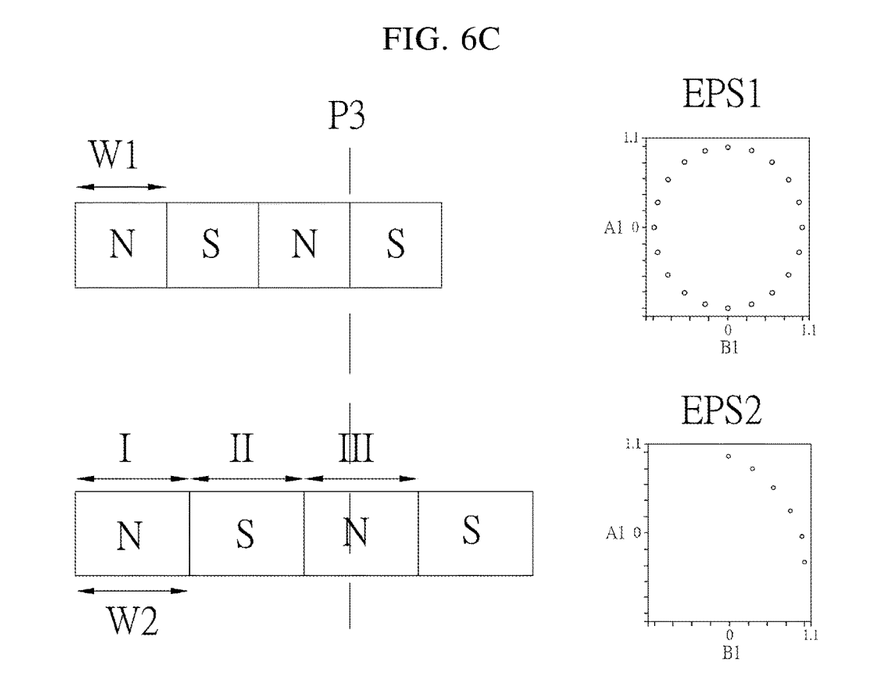

FIGS. 6A, 6B and 6C are the schematic diagrams respectively illustrating operating the absolute position detecting device in accordance with the present disclosure. It is similar to FIG. 5 that when the elliptical pattern reaches the positon P1, the sensor module moves to the first region I of the second magnetic path. So, when the first elliptical pattern forms a completed ellipse by the incremental magnetization track with the first pole widths W1, the encoding track with the second pole widths W2 reaches the positon of about 270° in the second elliptical pattern.

When the position reaches at the end of the secondary first magnetic pole in the first magnetic path, which is located at the doubled first pole widths W1. When the first elliptical pattern forms a complete circle by the incremental magnetization track with the first pole widths W1, the encoding track with the second pole widths W2 reaches the position of about 180° in the second elliptical pattern. Furthermore, when the position reaches the end of the third first magnetic pole in the first magnetic path, which is located at the triple first pole widths W1. When the first elliptical pattern forms a complete circle by the incremental magnetization track with the first pole widths W1, the encoding track with the second pole widths W2 reaches the position of about 180° in the second elliptical pattern. Similarly, the absolute positon information can be generated according to the unique relationships between the positons on the first elliptical pattern EPS1 and the second elliptical pattern EPS2 and the position at the first pole width W1 on the magnetic encoding ruler and stored in the database accordingly.

Figure 7:
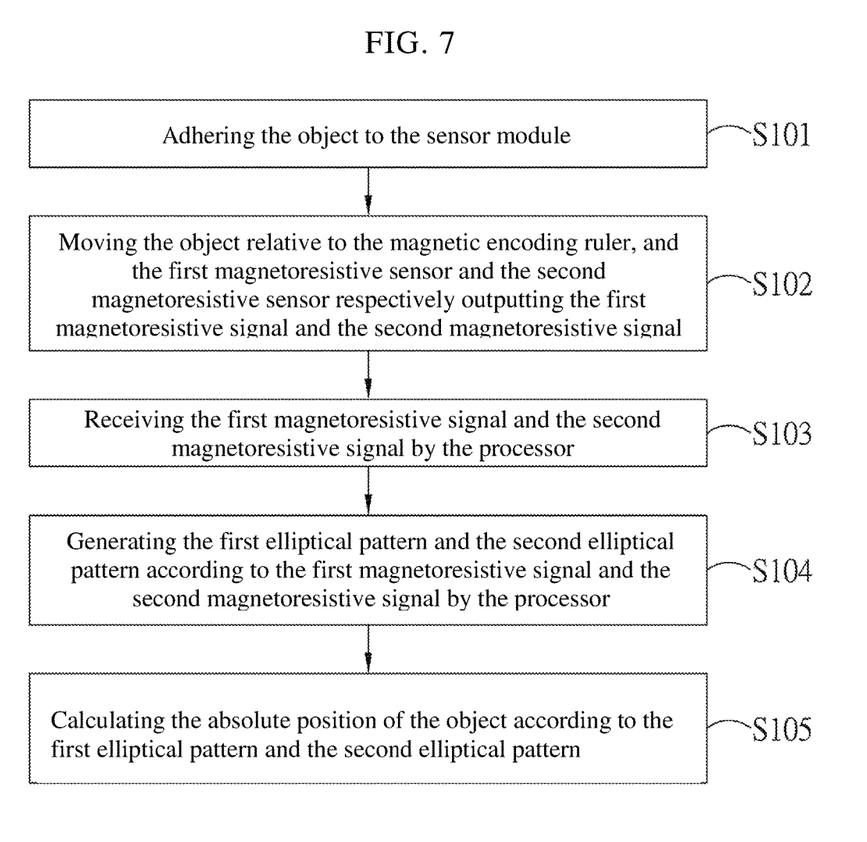
FIG. 7 is a flow chart of an embodiment of the method of detecting the absolute position in accordance with the present disclosure.

The method of detecting the absolute positon will be described in detail hereinafter according to FIG. 7, which is a flow chart of an embodiment of the method of detecting the absolute position in accordance with the present disclosure. Here, the method of detecting the absolute positon is adapted to the position detection device mentioned above, and includes following steps.

S101: adhering the object to the sensor module;

S102: moving the object relative to the magnetic encoding ruler, and the first magnetoresistive sensor and the second magnetoresistive sensor respectively outputting the first magnetoresistive signal and the second magnetoresistive signal;

S103: receiving the first magnetoresistive signal and the second magnetoresistive signal by the processor;

S104: respectively generating the first elliptical pattern and the second elliptical pattern according to the first magnetoresistive signal and the second magnetoresistive signal by the processor; and S105: calculating the absolute position of the object according to the first elliptical pattern and the second elliptical pattern.

Here, the first elliptical pattern and the second elliptical pattern are generated based on the first magnetoresistive signal and the second magnetoresistive signal, and the calculation of the absolute position of the object based on the first elliptical pattern and the second elliptical pattern both have been described in the preceding paragraphs. For the avoidance of doubt, the repeated descriptions are omitted hereinafter.

Figure 8:
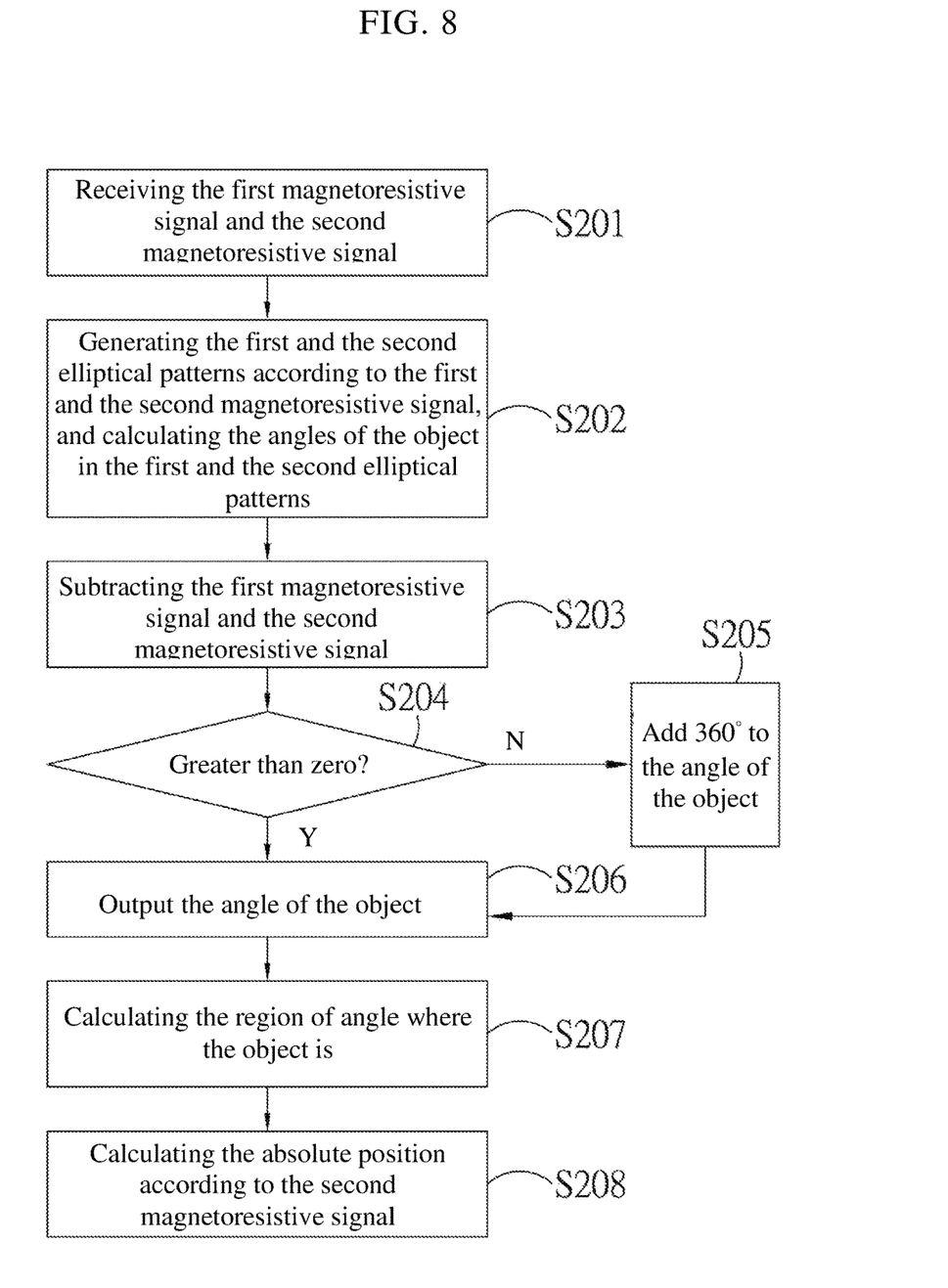
FIG. 8 is a flow chart illustrating the calculation of the method of detecting the absolute position in accordance with the present disclosure.

Referring to FIG. 8, which is a flow chart illustrating the calculation of the method of detecting the absolute position in accordance with the present disclosure. Specifically, for the sake of precisely calculating the absolute position of an object, the processor utilized in the position detecting device and the method may further be configured to execute the following steps:

S201: receiving the first magnetoresistive signal and the second magnetoresistive signal;

S202: generating the first elliptical pattern and the second elliptical pattern according to the first magnetoresistive signal and the second magnetoresistive signal, and calculating the angles of the object in the first and the second elliptical patterns;

S203: subtracting the first magnetoresistive signal and the second magnetoresistive signal;

S204: determining whether the subtracted signal is greater than zero after the subtraction; if yes, entering S206 to output the angle of the object in the elliptical patterns; if no, entering S205 to add 360° to the angle of the object, and entering S206 to output the angle where the object is;

S207: calculating the region of angle where the object is; and

S208: calculating the absolute position according to the second magnetoresistive signal.

As mentioned previously, the issue of the increasing numbers of sensors resulted from the necessary number of bits for encoding as the length of the magnetic encoding ruler increases can be solved. The absolute position can be obtained by only two magnetoresistive sensors without arranging the plurality of hall sensors to correspond to the pole widths of the magnetic encoding ruler. Hence, the present disclosure is cost-effectively feasible. Besides, whenever the absolute encoder is reset, the absolute position can be obtained rapidly according to the signal associated to the magnetic encoding ruler provided in the present disclosure so as to save the time for the initialization and relocating.

While the means of specific embodiments in present disclosure has been described by reference drawings, numerous modifications and variations could be made thereto by those skilled in the art without departing from the scope and spirit of the disclosure set forth in the claims. The modifications and variations should in a range limited by the specification of the present disclosure.

What is claimed is:

1. An absolute encoder, comprising:
a magnetic encoding ruler, comprising:
a first magnetic path on which a plurality of first magnetic poles with opposite polarities are successively arranged, wherein a length of each of the plurality of first magnetic poles is a first pole width;
a second magnetic path, parallel to the first magnetic path, on which a plurality of second magnetic poles with opposite polarities are successively arranged, wherein a length of each of the plurality of second magnetic poles is a second pole width, and the first pole width and the second pole width are different from each other;
a first magnetoresistive sensor disposed adjacent to the first magnetic path to detect magnetic fields of the first magnetic path and to generate a first magnetoresistive signal;
a second magnetoresistive sensor disposed adjacent to the second magnetic path to detect magnetic fields of the second magnetic path and to generate a second magnetoresistive signal; and
a processor electrically connected to the first and the second magnetoresistive sensors to respectively receive the first and the second magnetoresistive signals;
wherein the absolute encoder is configured to output the first and the second magnetoresistive signals;
wherein the lengths of north/south poles of the plurality of the second poles comprise second to Nth pole widths, and the lengths of the second to $N^{th}$ pole widths are different from each other;
wherein when the magnetic encoding ruler moves relative to the first and the second magnetoresistive sensors along a longitudinal direction of the magnetic encoding ruler, the processor is configured to generate a first elliptical pattern according to the first magnetoresistive signal and a second elliptical pattern according to the second magnetoresistive signal, and to generate a unique relation of the first elliptical pattern and the second elliptical pattern.

2. The absolute encoder of claim 1, further comprising a database electrically connected to the processor, the database storing absolute position information, and the absolute position information respectively defining relationships between positions on the first and the second elliptical patterns and positions on the magnetic encoding ruler;
wherein after the processor is configured to generate the first and the second elliptical patterns, the processor is further configured to compare the first and the second elliptical patterns with the absolute position information to obtain the absolute position on the magnetic encoding ruler.

3. The absolute encoder of claim 2, wherein the first magnetoresistive signal comprises a first A-phase signal and a first B-phase signal, the second magnetoresistive signal comprises a second A-phase signal and a second B-phase signal, and the processor is configured to generate the first elliptical pattern according to the first A-phase signal and the first B-phase signal, and to generate the second elliptical pattern according to the second A-phase signal and the second B-phase signal.

4. The absolute encoder of claim 2, wherein the plurality of first magnetic poles and the plurality of second magnetic poles are arranged along the longitudinal direction of the magnetic encoding ruler.

5. An absolute position detecting device adapted to detect an absolute position of an object, comprising:
a magnetic encoding ruler, comprising:
a first magnetic path on which a plurality of first magnetic poles with opposite polarities are successively arranged, wherein a length of each of the plurality of first magnetic poles is a first pole width;
a second magnetic path, parallel to the first magnetic path, on which a plurality of second magnetic poles with opposite polarities are successively arranged, wherein a length of each of the plurality of second magnetic poles is a second pole width, and the first pole width and the second pole width are different from each other;
a sensor module adhered to the object, comprising:
a first magnetoresistive sensor disposed adjacent to the first magnetic path to detect magnetic fields of the first magnetic path and configured to generate a first magnetoresistive signal; and
a second magnetoresistive sensor disposed adjacent to the second magnetic path to detect magnetic fields of the second magnetic path and to generate a second magnetoresistive signal;
a processor electrically connected to the first and the second magnetoresistive sensors to respectively receive the first and the second magnetoresistive signals, wherein when the object moves relative to the magnetic encoding ruler, the processor is configured to generate a first elliptical pattern according to the first magnetoresistive signal, and to generate a second elliptical pattern according to the second magnetoresistive signal, and to calculate the absolute position of the object according to the first and the second elliptical patterns;
wherein the lengths of north/south poles of the plurality of the second poles comprise a second to Nth pole widths, and the lengths of the second to Nth pole widths are different from each other;
wherein the absolute position of the object is generated according to a unique relation of the first and the second elliptical patterns.

6. The absolute position detecting device of claim 5, further comprising a database electrically connected to the processor, which stores absolute position information, the absolute position information respectively defining relationships between positions on the first and the second elliptical patterns and positions on the magnetic encoding ruler; and
wherein after the processor is configured to generate the first elliptical pattern and the second elliptical pattern, the processor is further configured to compare the first elliptical pattern and the second elliptical pattern with the absolute position information to obtain the absolute position of the object on the magnetic encoding ruler.

7. The absolute position detecting device of claim 5, wherein the first magnetoresistive signal comprises a first A-phase signal and a first B-phase signal, the second magnetoresistive signal comprises a second A-phase signal and a second B-phase signal, and the processor is configured to generate the first elliptical pattern according to the first A-phase signal and the first B-phase signal, and to generate the second elliptical pattern according to the second A-phase signal and the second B-phase signal.

8. The absolute position detecting device of claim 5, wherein the plurality of first poles and the plurality of second poles are arranged along a longitudinal direction of the magnetic encoding ruler.

9. A method of detecting an absolute position adapted to the absolute position detecting device of claim 5, comprising following steps of:

adhering an object to the sensor module;

moving the object relative to the magnetic encoding ruler, the first magnetoresistive sensor and the second magnetoresistive sensor respectively outputting the first magnetoresistive signal and the second magnetoresistive signal;

receiving the first magnetoresistive signal and the second magnetoresistive signal by the processor, and generating a first elliptical pattern according to the first magnetoresistive signal and a second elliptical pattern according to the second magnetoresistive signal, respectively; and calculating the absolute position of the object on the magnetic encoding ruler according to the first and the second elliptical patterns by the processor;

wherein lengths of north/south poles of the plurality of the second poles comprise a second to Nth pole widths, and the lengths of the second to Nth pole widths are different from each other;

wherein the absolute position of the object is generated according to a unique relation of the first and the second elliptical patterns.

10. The method of detecting an absolute position of claim 9, wherein the first magnetoresistive signal comprises a first A-phase signal and a first B-phase signal, the second magnetoresistive signal comprises a second A-phase signal and a second B-phase signal, and the processor is configured to generate the first elliptical pattern according to the first A-phase signal and the first B-phase signal, and to generate the second elliptical pattern according to the second A-phase signal and the second B-phase signal.

11. The method of detecting an absolute position of claim 9, wherein the plurality of first poles and the plurality of second poles are arranged along a longitudinal direction of the magnetic encoding ruler.

12. The method of detecting an absolute position of claim 9, wherein the plurality of first magnetic poles and the plurality of second magnetic poles are arranged in a circle arrangement.

* * * * *